United States Patent [19]
Rouquette et al.

[11] Patent Number: 5,920,589
[45] Date of Patent: Jul. 6, 1999

[54] DIRECT SEQUENCE SPREAD SPECTRUM DSP SYSTEM

[75] Inventors: Robert E. Rouquette, Kenner; Gary A. Naden, Mandeville; H. Britton Sanderford, New Orleans, all of La.

[73] Assignee: Sanconix Inc., New Orleans, La.

[21] Appl. No.: 08/559,913

[22] Filed: Nov. 17, 1995

Related U.S. Application Data

[63] Continuation-in-part of application No. 08/485,007, Jun. 7, 1995.

[51] Int. Cl.$^6$ .................................................. H04B 1/707
[52] U.S. Cl. ............................................................ 375/206
[58] Field of Search ................................... 375/200, 206, 375/208, 209, 210, 316; 455/323, 324; 341/123

[56] References Cited

U.S. PATENT DOCUMENTS

| | | | |
|---|---|---|---|
| 4,888,557 | 12/1989 | Duckette, IV et al. | 329/341 |
| 5,103,459 | 4/1992 | Gilhousen et al. | 375/200 |
| 5,454,007 | 9/1995 | Dutta | 375/322 |
| 5,557,642 | 9/1996 | Williams | 375/316 |

*Primary Examiner*—Don N. Vo
*Attorney, Agent, or Firm*—Oblon, Spivak, McClelland, Maier & Neustadt, P.C.

[57] ABSTRACT

A direct sequence spread spectrum (DSSS) DSP implementation technique utilizing a unique combination of multiple filters, transforms, despreading algorithm and spectral compression, all in a single coefficient set, providing a highly efficient system requiring relatively nominal computational hardware and software requirements. Reallocatable computational resources allow for frequency uncertainty in the transmitter, without the typical excessive noise bandwidth penalties. The present system further contemplates a unique energy detection algorithm for discerning spread spectrum while in the search mode, utilizing several discrete sampling data sets to increase signal strength, reducing noise, while changing the relative phase of the received chipping code with respect to the received signal. The spectral compression of the spreading sequence is achieved by representing the PRC as an array of two, complimenting fractional coefficients. The PRC code is filtered to achieve the required spectral compression characteristics, resulting in minimal despreading loss, while providing interference rejection of CW signals greater than 1.5 MHz from the center IF frequency.

14 Claims, 9 Drawing Sheets

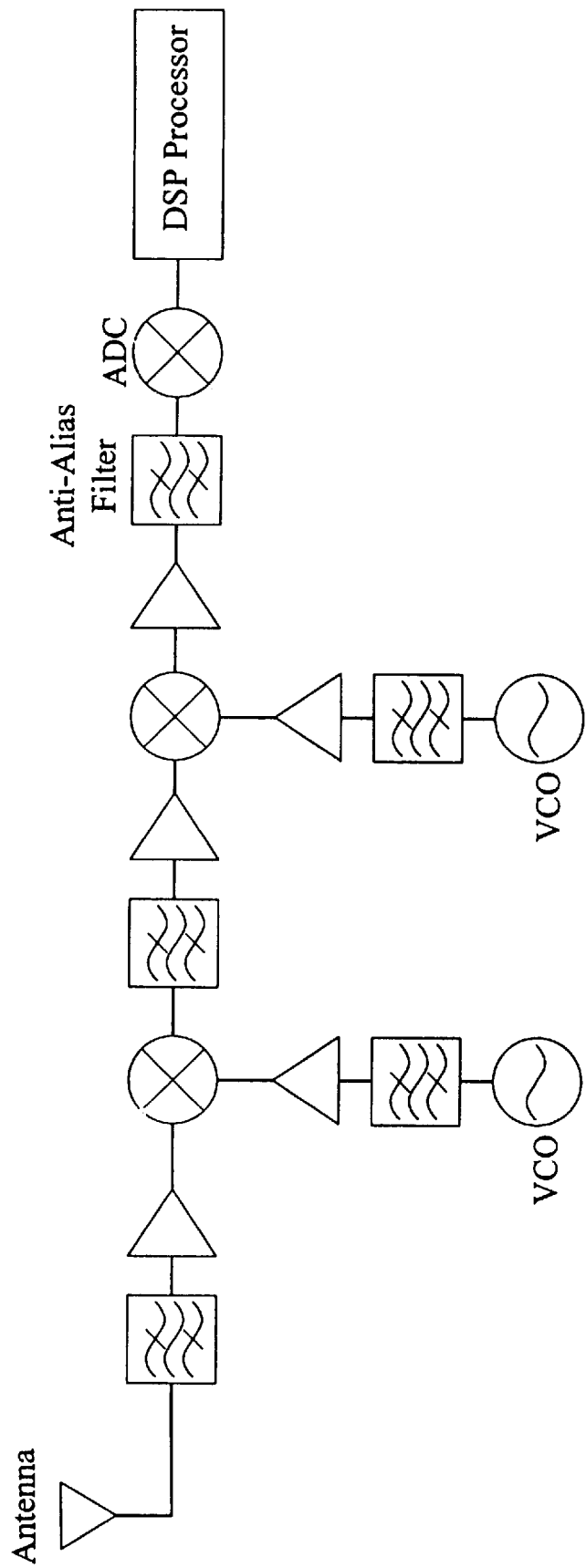
Figure A1
Prior Art

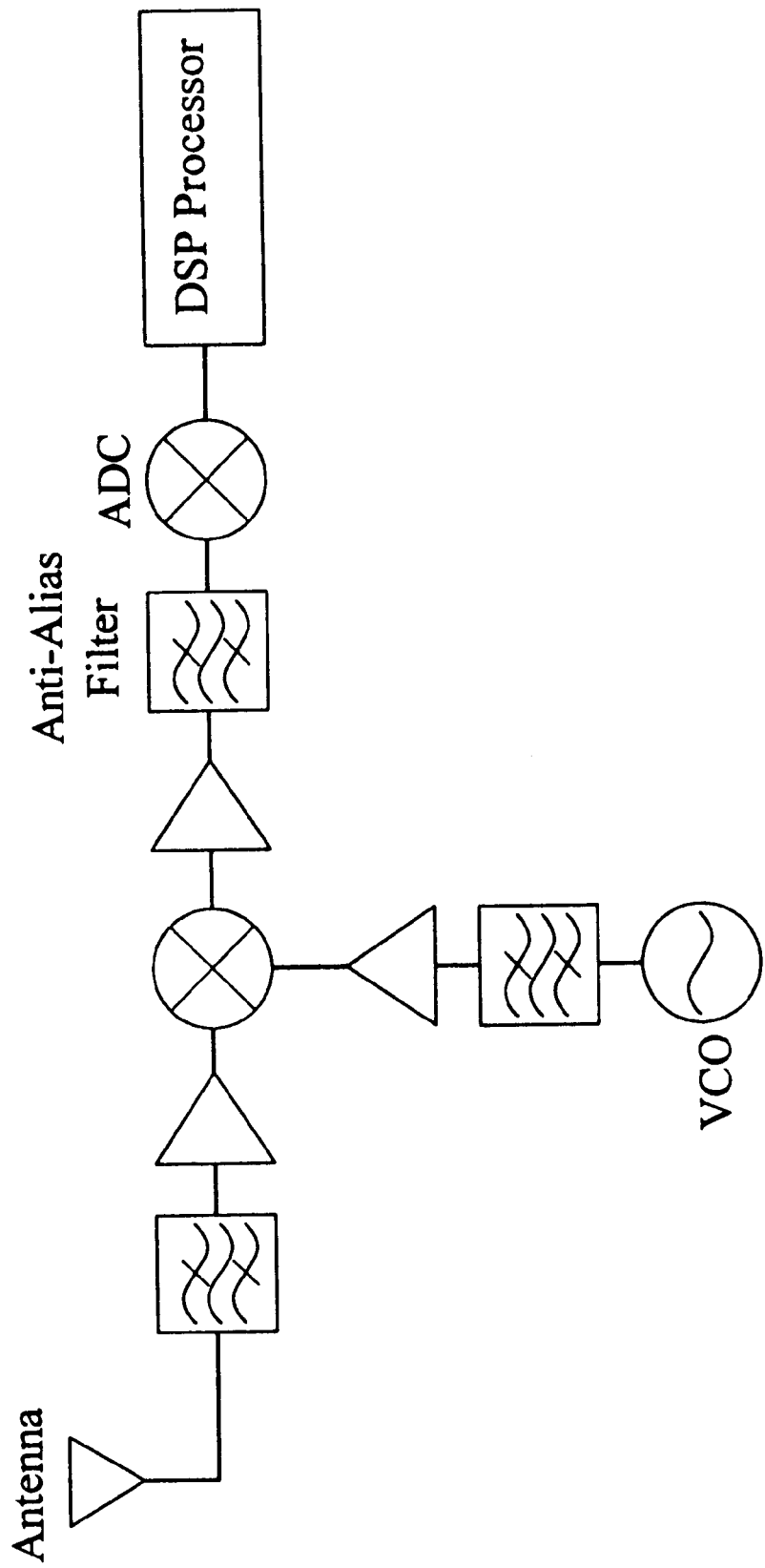
Figure A2
Prior Art

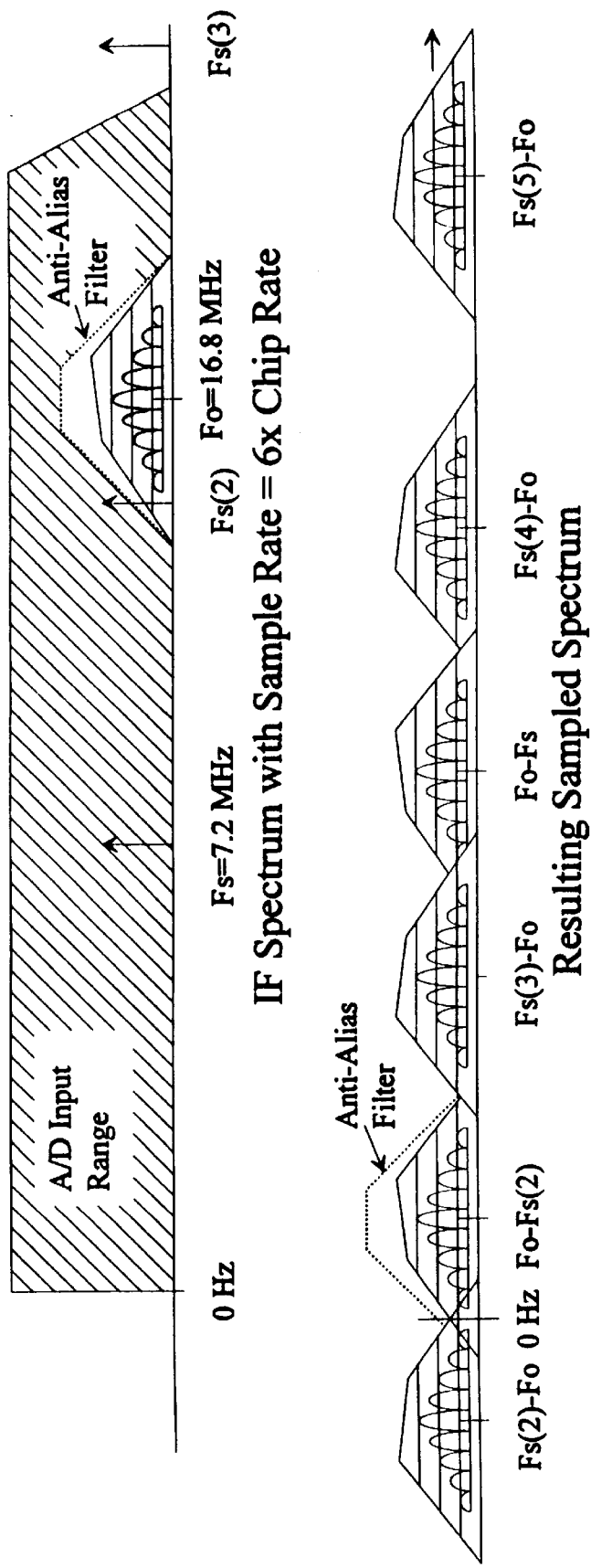
Figure A3
Prior Art

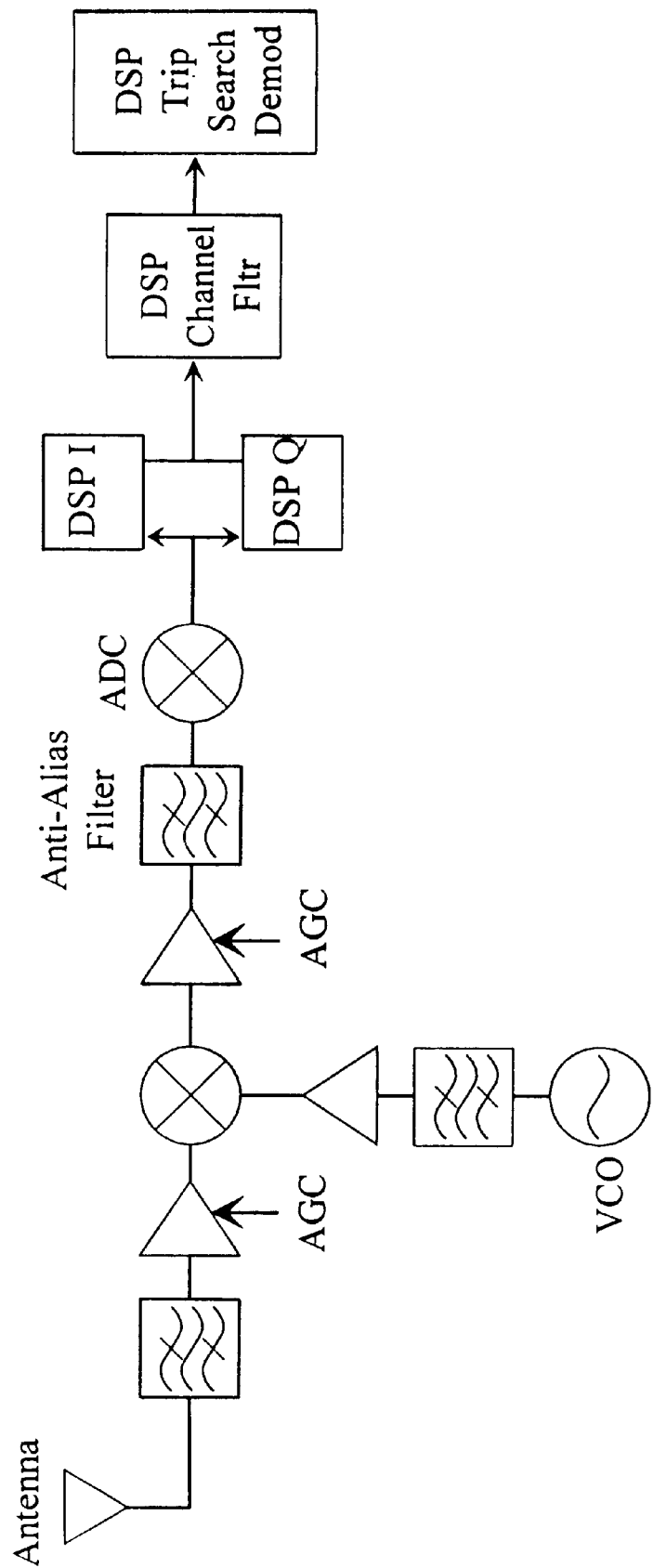
Figure A4
Prior Art

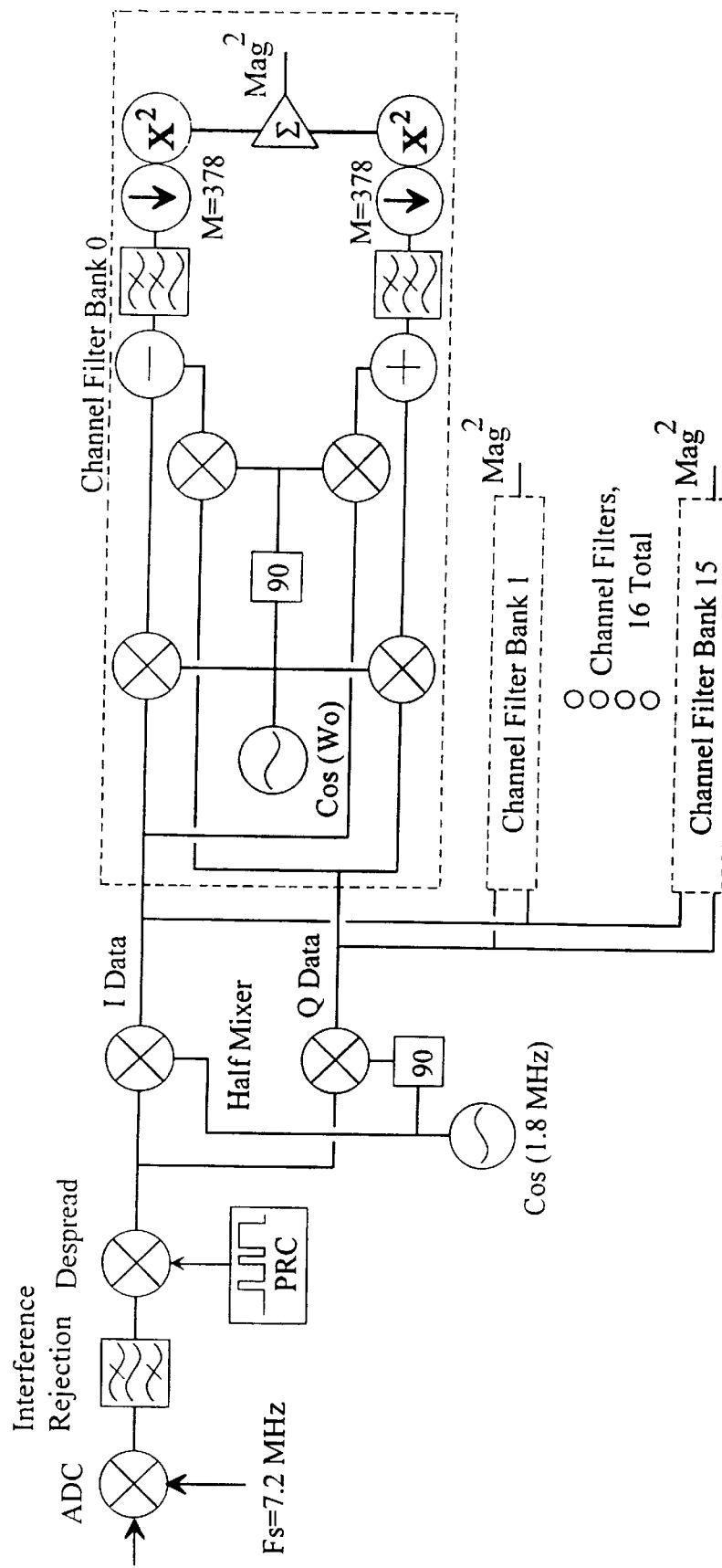
Figure A5

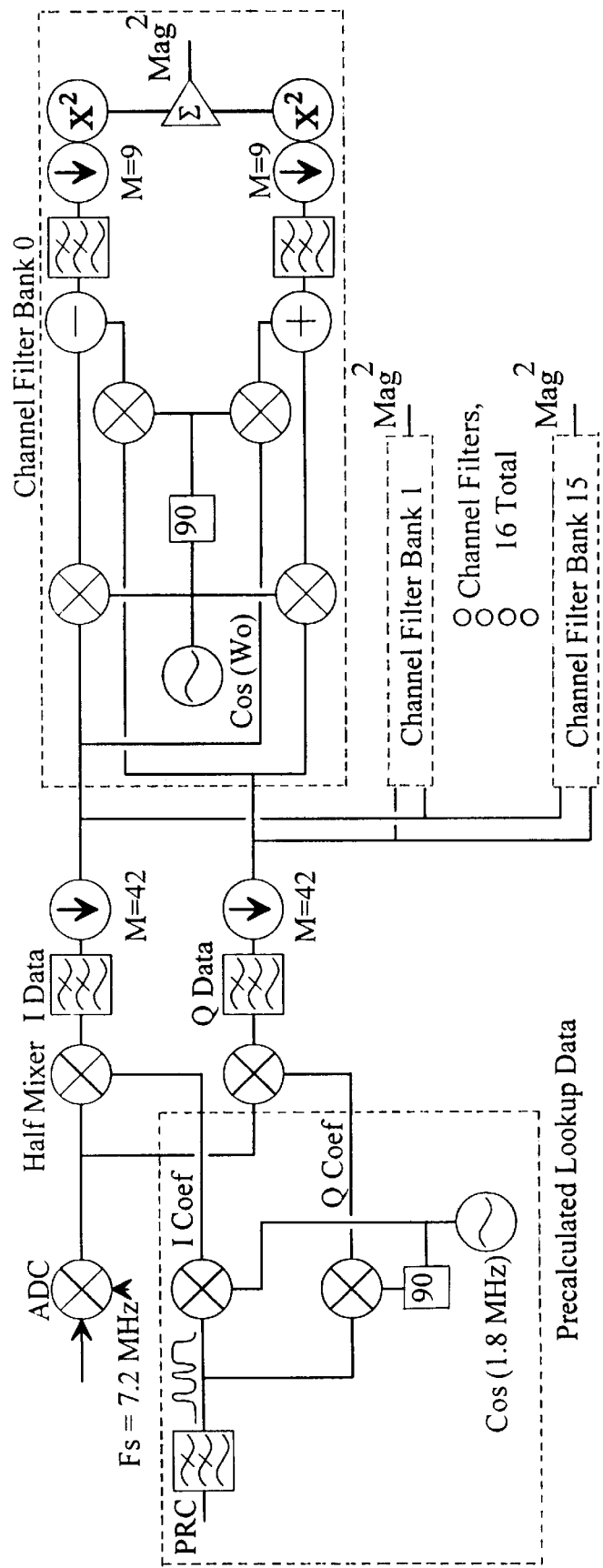
Figure A6

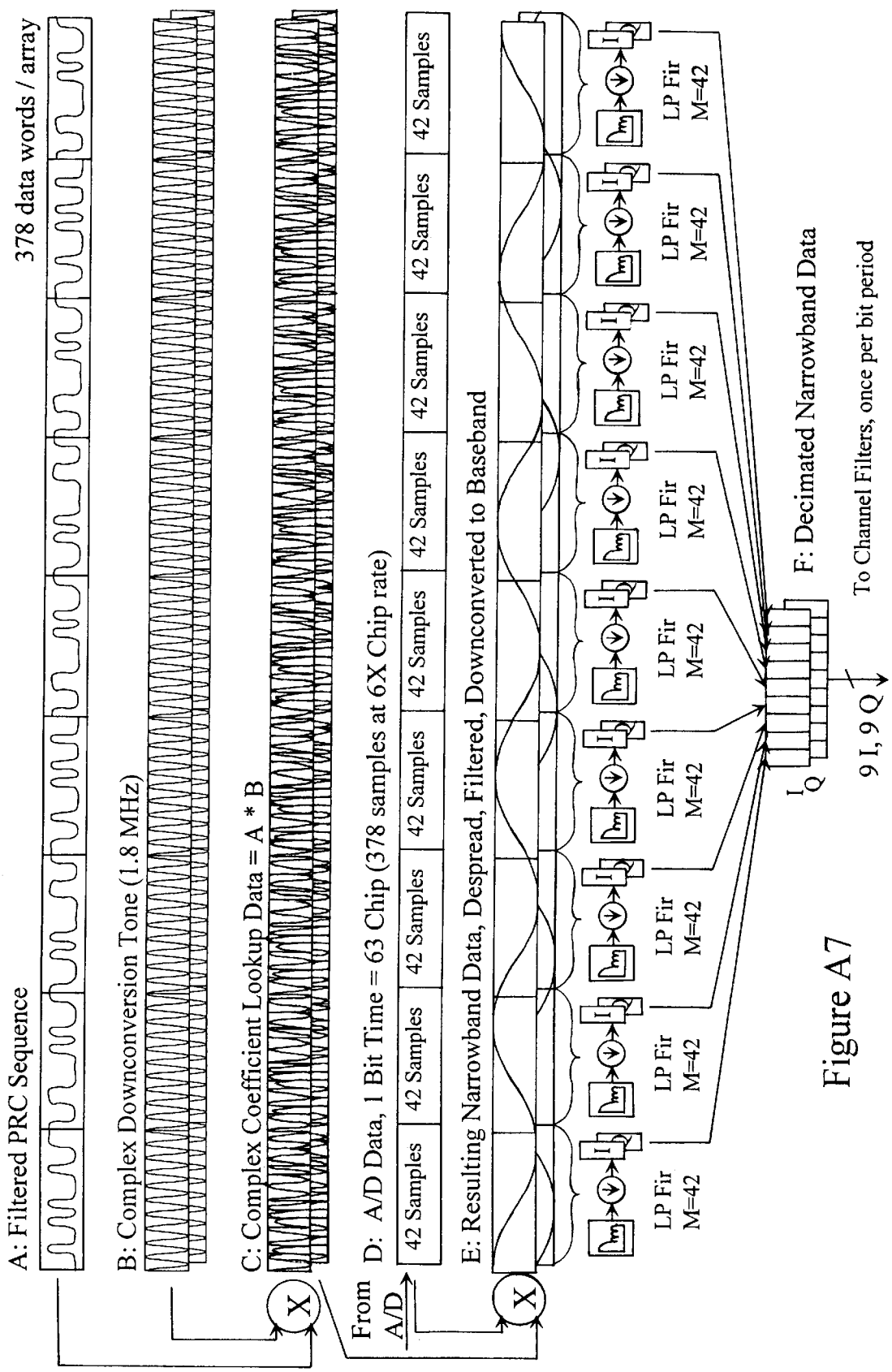
Figure A7

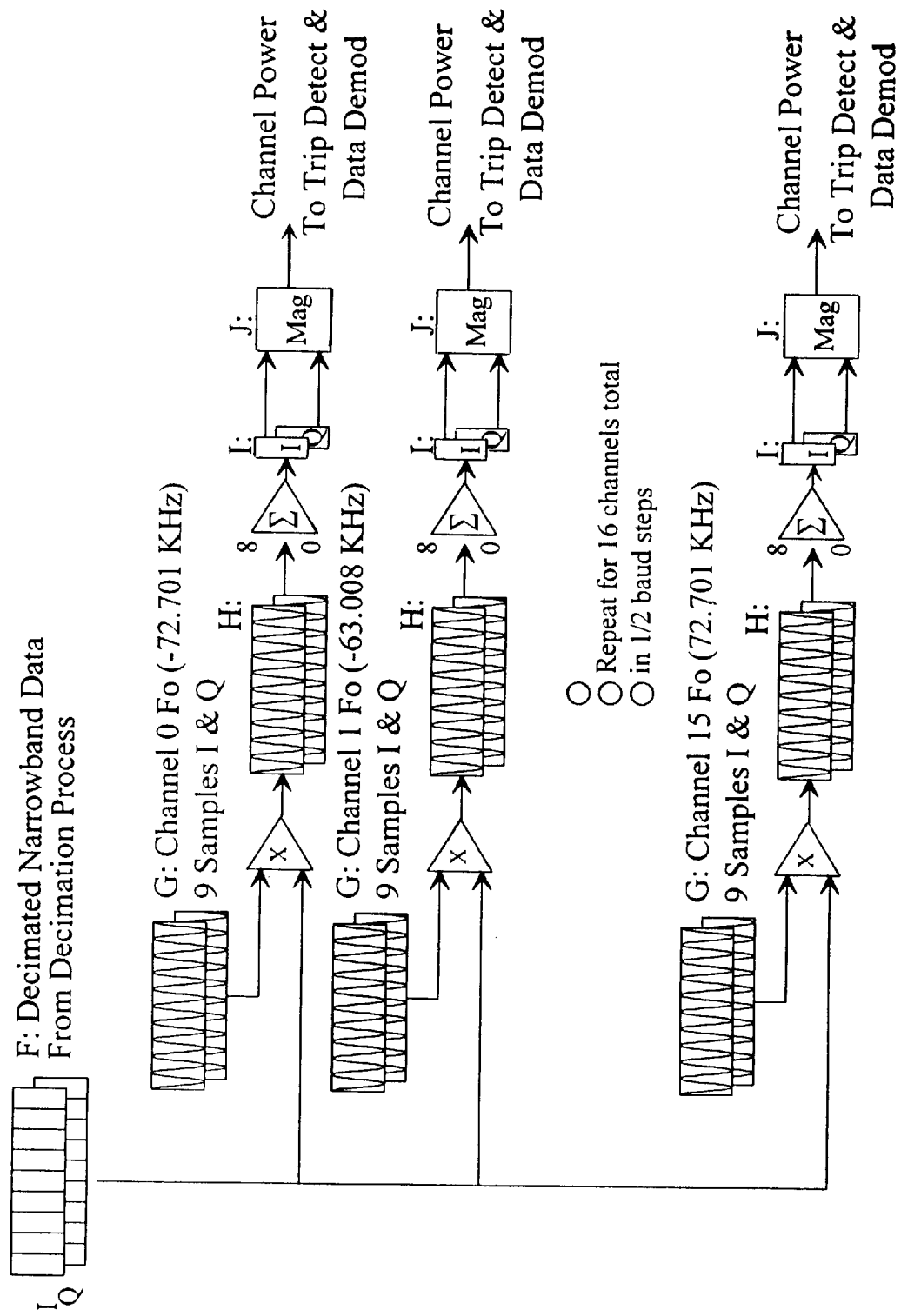
Figure A8

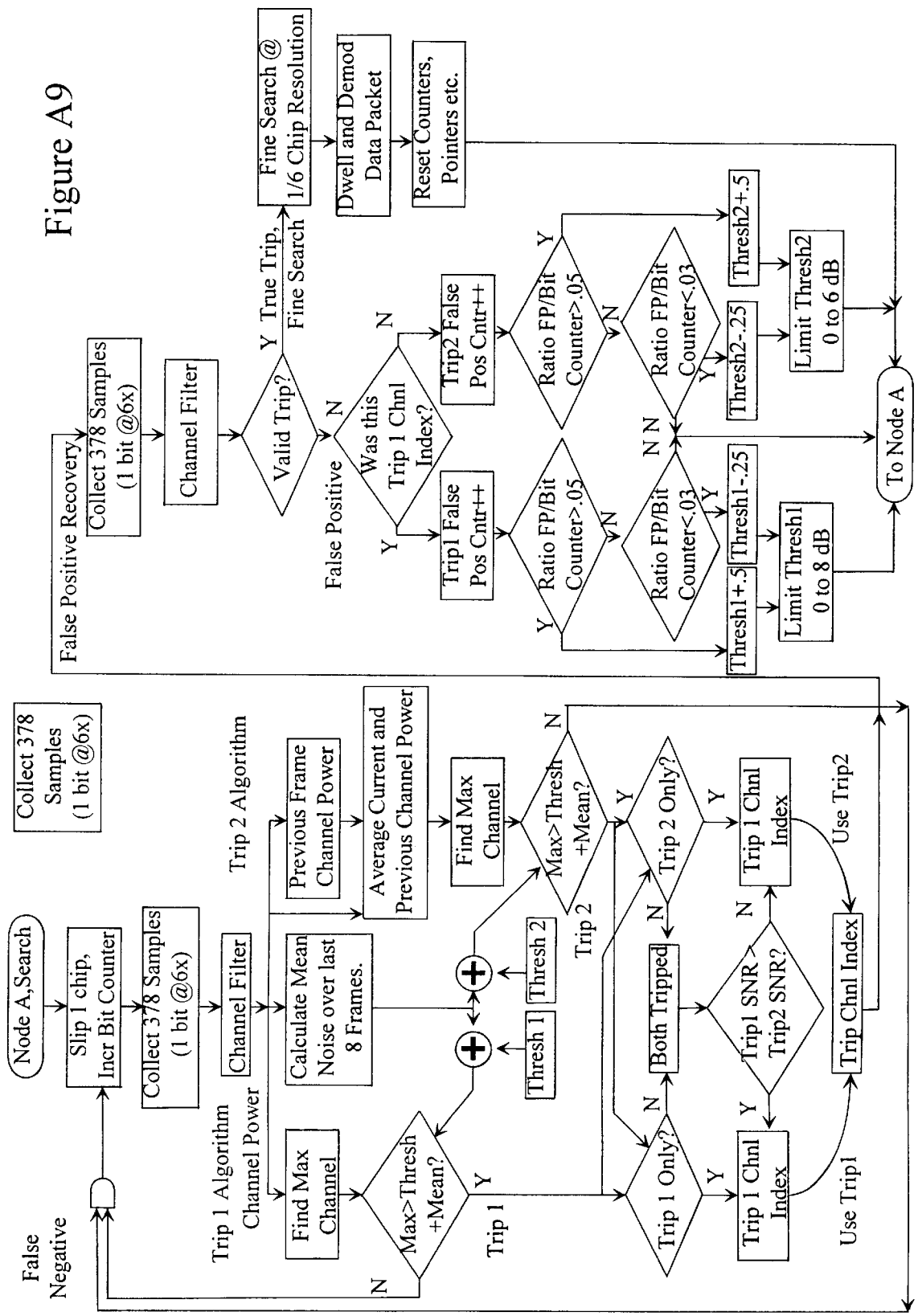
Figure A9

DIRECT SEQUENCE SPREAD SPECTRUM DSP SYSTEM

REFERENCE TO A RELATED APPLICATION

This application is a continuation-in-part of patent application Ser. No. 08/485,007 filed Jun. 7, 1995, entitled, "Direct Sequence Frequency Ambiguity Resolving Receiver", listing as inventor H. Britton Sanderford.

TECHNICAL FIELD OF THE INVENTION

The present invention relates to spread spectrum systems, and in particular to a direct sequence spread spectrum (DSSS) DSP implementation technique utilizing a unique combination of multiple filters, transforms, despreading algorithm and spectral compression, all in a single coefficient set, providing a highly efficient system requiring only relatively nominal computational hardware and software requirements. Reallocatable computational resources allow for frequency uncertainty in the transmitter, without the typical excessive noise bandwidth penalties.

The present system further contemplates a unique energy detection algorithm for discerning spread spectrum while in the search mode, utilizing several discrete sampling data sets to increase signal strength and reduce noise, while changing the relative phase of the received chipping code with respect to the received signal.

The spectral compression of the spreading sequence is achieved by representing the Pseudo Random Code (PRC) as an array of twos, complimenting fractional coefficients. The PRC code is filtered to achieve the required spectral compression characteristics, resulting in minimal despreading loss, while providing interference rejection of CW signals greater than 1.5 MHz from the center IF frequency.

BACKGROUND AND GENERAL SUMMARY DISCUSSION

The concepts of harmonic sampling, quadrature mixing and sinusoidal transforms are well known methods for conditioning signals for processing in computer devices. The DSSS DSP receiver uses these concepts with the innovative teachings of this document to receive, despread, detect and demodulate a direct sequence signal using DSP microprocessor type hardware structures.

U.S. Pat. No. 5,067,136 issued Nov. 19, 1991 teaches a "Wireless Alarm System", contemplating a spread spectrum receiver which:

Converts the received signal to lower frequencies utilizing the RF section;

Includes a chip code generator with means of chip code phase shifting for achieving correlation lock;

Teaches means to measure both signal strength and quieting to detect correlation lock over the dynamic range of the system;

Utilizes an adaptive data demodulator tolerant to DC; i.e. long strings of 1's or 0's; and Implementing microprocessor algorithms to perform the above.

See particularly FIGS. 3A and 4 of '136, teaching respectively, a block diagram of a spread spectrum receiver, and a flow chart of the code locking algorithm. The present, applied for invention builds upon some of the basic concepts embodied in this system, nonetheless teaching improvements which are believed patentable on their own.

In the system of the present, applied for invention, the signal is received and converted to an intermediate frequency (IF) for sampling by an analog to digital converter (ADC). The methods for conditioning the signal for use by the converter are well known in the art and not part of this teaching. The specific implementation described herein does make one interesting if not novel use of the converter in that the ADC is used as the second downconversion mixer in the radio.

It is therefore an object of the present invention to provide a DSSS DSP implementation technique requiring relatively nominal computational hardware and software requirements.

It is another object of the present invention to provide a unique energy detection algorithm for discerning spread spectrum while in the search mode, sampling in a matter which increases strength, reduces noise, and changes the relative phase of the received chipping code with respect to the received signal.

It is still another object of the present invention to provide a unique PRC code filtration technique, resulting in minimal despreading loss, while providing interference rejection of CW signals greater than 1.5 MHz from the center IF frequency.

BRIEF DESCRIPTION OF DRAWINGS

For a further understanding of the nature and objects of the present invention, reference should be made to the following detailed description, taken in conjunction with the accompanying drawings, in which like parts are given like reference numerals, and wherein:

FIG. A1 is a block diagram illustrating a conventional ADC conversion IF cascade, with an RF front end normally found in sampling systems, utilizing two IF frequency downconversion steps to bring the signal of interest to or near baseband.

FIG. A2 is a block diagram illustrating a conventional version of the ADC conversion IF cascade of FIG. A1, wherein the second downconverting mixer has been eliminated, utilizing the ADC as a mixer to perform the function.

FIG. A3 is a block diagram illustrating a conventional DSSS DSP sampling considerations, illustrating how the ADC can be made to downconvert a signal bandwidth well above the actual sample rate, by choosing the sample rate with respect to the signal frequency of interest.

FIG. A4 is a block diagram illustrating a hardware architecture of the conventional DSSS DSP receiver, employing harmonic sampling as well as partitioning of the DSP firmware algorithms into multiple separate physical processing engines.

FIG. A5 illustrates an equivalent firmware algorithm in block diagram form of the hardware architecture of the DSSS DSP receiver of the invention of FIG. A4.

FIG. A6 illustrates a simplified equivalent hardware block diagram version of FIG. A5, combining various components and operations to provide a simplified system with computationally reduced architecture requirements.

FIG. A7 teaches an exemplary DSP Decimation Process of the present invention, wherein a filtered PRC sequence is combined with a complex downconversion tone to produce complex coefficient lookup data for sampling via A/D converter.

FIG. A8 teaches an exemplary DSP Channel Filter Process of the present invention, wherein decimated narrowband data from the decimation process of FIG. A7 is sampled in various channels to provide data.

FIG. A9 teaches a Two Stage Adaptive Trip Algorithm which may be utilized in conjunction with the hardware architecture of FIG. A6.

DETAILED DISCUSSION OF THE INVENTION

FIG. A1 depicts a typical two conversion RF front end normally found in sampling systems. In this architecture, two IF frequency downconversion steps are used to bring the signal of interest to or near baseband.

As shown in FIG. A2, a simplified RF cascade can be realized using the principles of harmonic sampling. The second downconverting mixer can be removed in the circuit as the ADC acts as a mixer to perform the function.

This simplification is possible using the principles of harmonic sampling. It is widely known in the art that for a signal to be adequately sampled, the sample rate must be at least twice the highest frequency of interest. This is known as the Nyquist criterion for sampling. This is often misrepresented, and misstated that the sampling frequency must be twice the signal frequency. This is not accurate. The sampling rate must be at least twice the information bandwidth for the signal to be accurately represented. Harmonic sampling, or subsampling, uses the properties of the frequency domain representation of a square wave to select an image of interest for downconversion.

A square wave, like the signal applied to the sample pin of the ADC, has a frequency spectrum of a series of impulse functions separated by the frequency of the square wave. These impulse functions exist to infinity and are the basis for images in digital sampling. By choosing the sample rate with respect to the signal frequency of interest, the ADC can be made to downconvert a signal bandwidth well above the actual sample rate.

Referring to FIG. A3, choosing the sample rate with respect to the signal frequency of interest, the ADC can be made to downconvert a signal bandwidth well above the actual sample rate. In the depicted case, the signal IF of interest lies just above two times the sample rate of 7.2 MHz. The resulting sampled data transposes the signal IF as the sums and differences of the sample rate (and all its multiples) and the signal IF of interest. Aliased images are also created and care must be taken to ensure the images do not overlap the downconverted image destructively.

The implemented receiver uses this principle to downconvert the spread spectrum and remove the second mixer from the RF front end. Several considerations must be observed for this to be effective. Most ADC devices are band limited on the input. As the signal frequencies go higher, the track and hold circuits must not slew limit the signal as non-linearities are observed. Also, as the signal is driven higher with respect to the sample rate, the effects of sampling jitter are multiplied and this creates phase noise on the sampled signal. If the effects of slew limiting, and aperture jitter are small with respects to normal signal parameters, then this technique is acceptable.

In the case of direct sequence, phase noise is an inherent signal problem as the receiver must always deal with imperfect correlation. The effects of phase noise is therefore normally not noticeable, specifically if it is managed at levels below the process gain of the system.

FIG. A4 depicts the implemented hardware architecture of the receiver. It employs the principles of harmonic sampling as well as partitioning the DSP firmware algorithms into four physical processing engines.

The implemented DSP algorithms employ several concepts drawn from the art and several innovative techniques which simplify the design to realizable proportions. FIG. AS depicts the firmware algorithm using hardware symbols to simplify the description.

The data is sampled in the ADC at 7.2 MHz followed by a bandpass filter to remove aliased images as well as out of band interference. The digital data is then despread by mixing it against a pseudo-random code. The resulting data is narrowband, but still represented at the full sample rate. The data is then transformed into complex data using a half mixer, Hilbert transform or other similar technique. By choosing the sample rate with respects to the IF center frequency, the resulting downconverted signal bandwidth is ideally centered in the Nyquist bandwidth. This keeps the aliased images at a maximal distance in the frequency spectrum from the image of interest. The conversion could bring the image to baseband, but the negative image would overlap the signal and destroy the systems ability to differentiate negative from positive frequency uncertainties. By combining a quadrature CW signal into the half mixer, the final baseband conversion is accomplished in the DSP, while the signal is converted real to quadrature in the halfmixer. The data is then passed in quadrature to parallel filter banks which perform a sinusoidal transform at the sample rate. This is the equivalent of calculating a single point of a DFT. This architecture represents a typical method for despreading the signal in a digital process.

The problem exists in that it is computationally intensive as the data is represented at twice full sample rate (I and Q) at each filter bank. In the case of the depicted example the computational loading can be estimated as follows: Assuming the interference rejection to be implemented as a FIR filter (as IIR filter would not be suitable for a short up time acquisition system), and further assuming the FIR would require at least 41 taps to achieve the desired rejection, the computational requirement for the filter would be:

63 chips*6 oversample rate*41taps=15498 multiply accumulates per bit period.

The despread function would require 378 multiply cycles. The half mixer requires 2*378 multiply cycles. Each channel filter performs a complex vector multiply function. To produce the In Phase product requires 2*378 multiply accumulate cycles plus 378 cycles to subtract accumulate the two resulting vectors while decimating plus one multiply to square the I decimated term function. A like computational loading is necessary for the Q channel vector.

The final computational estimate is therefore:

15498+378+2(378)+(16)(2)[2(378)+1+378]=52952 multiply/add cycles.

A simplified approach uses the principle of decimation plus combination of several of the above functions to greatly reduce the computational loading. Decimation is a technique to reduce the sample rate to process the data at the minimum rates necessary to preserve the frequencies of interest. It is equivalent to sampling and therefore the principles of sampling must be observed including the observance of aliasing.

Because the mixers are realized in the processors using vector multiplies, the associative property of multiplication provides a means of combining several of the functions together to greatly reduce the computational requirements of the hardware. This combination of functions is the innovative process in this teaching and will be demonstrated to simplify the overall design implementation considerably.

By combining the interference rejection filter, the despreading signal, the half mixer and the decimation process, the design is reduced to a pair of high data rate vector multiplies. FIG. A5 depicts the computationally reduced architecture. The PRC data set is filtered and combined with the half mixer components at compile time to create a combined, hybrid set of coefficients. Two coefficient arrays are created, one for use in the In Phase data stream (I Data), one for use in the Quadrature data stream (Q Data).

Because the vector multiply precedes a decimation stage, the multiply need only be performed once per bit period and does not incur the recursive penalty of a full data rate FIR filter. The half mixer simultaneously performs the interference rejection, despreading, final baseband downconversion and is coupled with the decimation process. The decimation process is preceded by a lowpass filter to remove aliased images prior to downsampling.

Decimation will eventually result in a single vector for the bit period for each channel filter bank. This implementation performs the decimation in two steps. The first step brings the effective sample rate to just above twice the system frequency error budget. The 378 samples at 7.2 MHz rate are decimated to 18 samples (9 I and 9 Q) with an effective sample rate of 171.43 KHz. This gives the channel filters a maximum frequency error budget of 85.7 KHz.

The decimation filter is designed to attenuate the aliased images which resulted from the initial sampling in the ADC. As the images need only be reduced to a level as to be insignificant, a simple filter can be realized by windowing with a rectangular function whose frequency domain rolloff falls as 1/F. While this is an admittedly poor filter, it maximizes correlation energy by passing all the energy in the bit period while attenuating the images at least 15 dB. As the images are reduced below trip threshold, this filter is adequate for acquisition needs and can be realized by simply summing all the time domain products in the decimation block.

While the rectangular window filter maximizes sensitivity, it sacrifices the systems ability to reject strong interference out of band. A narrowband interference signal outside the initial signal of interest bandwidth will be downconverted as well as the signal of interest by the ADC. The initial hardware anti-alias filter may only attenuate this signal partially. When the desired signal is despread, the narrowband signal will be spread by our PRC code.

Shaping of this PRC code will spectrally compress this signal, but the peak will only be brought down by the process gain, in this case 18 dB. If this signal exists near ½ the original sample rate (3.6 MHz in this case), the signal will be aliased in band during the decimation process at an attenuation of only 18 dB.

In the case where strong interference exists, a tradeoff of sensitivity for interference rejection can be realized by performing a 42 point lowpass FIR during the decimation process. Signal components outside the signal of interest can be effectively obliterated and reductions of 100 dB or more are attainable. Because the FIR coefficients are not rectangular, some correlation loss is incurred and a reduction in sensitivity is observed.

In either case, the decimation filter is associative with the despreading mixer and these coefficients can also be included in the half mixer terms.

Once the first decimation process is complete, only 18 samples exist for processing by the channel filters. The channel filters are the same as before except they only have to work against a 9 point complex number. Each channel filter performs a sinusoidal transform and completes the decimation using a rectangular windowing filter which allows the resulting products to be summed.

The simplified algorithm reduces computational loading. The initial despreading, filtering and decimation function requires only 378 multiply accumulates for each I or Q data stream (storing off 9 intermediate results to generate the intermediate decimated data set). Each of the 16 channel filters perform a 9 point complex multiply with an estimated computational loading of 16[4(9)+2]. The simplified system computational loading is therefore:

$$2(378)+16[4(9)+2]=1364$$

A better than 97% reduction in computational loading is realized in this example.

DSP Implementation, Flow Description

FIGS. A7 and A8 depict an exemplary firmware architecture for realizing the device depicted in FIG. A6. The following discussion details an exemplary method for creating the combined coefficient table and processing real data as sampled from an ADC.

Lines A, B, and C depict the combination of the filtered PRC despread signal with the downconversion tone to create the coefficient lookup data. Optionally, a low pass FIR can be combined in this same lookup data. The PRC data is real and when multiplied with the downconversion signal becomes complex. Line C depicts the resulting complex coefficient data to be used in despreading and downconverting the ADC data. Line C is considered to contain "hybrid" information as it a combination of the PRC and downconversion signal.

Line D represents 378 samples of data collected at 6 times the chipping rate (6×63).

Line E represents the vector multiply of the ADC data (D:) with the complex coefficient lookup data (C:). The signal represented in this complex line is despread, narrowband and centered at baseband (0 Hz). If the chip phase of the sampled data (D:) aligns with the chip phase of the PRC (A:) a maximum will be observed in signal strength. The frequency of this maximum will be dependent on the error of the transmitted frequency with respect to the receiver frequency. If no error exists, the frequency of the despread signal will be DC. As the error term grows, the signal frequency will increase.

The signal in Line E is narrowband but still represented at the 6×chip sample rate. This rate far exceeds the maximum frequency uncertainty caused by transmitter vs. receiver error. The sample rate can be reduced by a decimation in time. The decimation function also serves to realize the increase in dynamic range due to oversampling. Any decimation process must be preceded by an anti-alias filter. If no filter is performed, the images will be aliased in the band of the resulting sample rate.

Several decimation filters can be realized depending on the system needs. Where interference is not an issue, signal sensitivity can be maximized by not filtering the PRC and performing a rectangular windowing function for decimation. As the rectangular window has a frequency spectral shape of 1/F, it is a poor filter for removing aliased images or interference, but it maximizes correlation power. A rectangular window merely weights the data uniformly and performs an averaging function for the data in the decimation block.

Where interference is a problem, a FIR filter can be used in the decimation process to effectively obliterate images. Care should still be taken to insure all bands of interest are adequately attenuated as the FIR is only effective up to multiples of the sample rate. If the interference term lies on the sample rate, the FIR may be ineffective. The PRC filter is valuable here, as it will shape the spread signal and attenuate the CW signal located at the sample rate. The weighted FIR coefficients can be combined in the complex coefficient lookup data (C:). The decimation process can then be performed identically whether the FIR coefficients are used or a rectangular windowing function is used.

The purpose of the decimation function is to reduce the sample rate and thus reduce the computational loading required to perform the channel filter process. The resulting decimated data must preserve a sample rate at least twice the frequency uncertainty of the system. By dividing the 378 products for the bit period into 9 equal blocks, the effective sample rate drops to 171.43 KHz giving a maximum frequency uncertainty of 85.7 KHz. For our system, frequency uncertainty is 150 KHz (±75 KHz) so this sample rate is sufficient.

Line F: depicts the complex decimated data for the bit period. Each of the 9 complex pairs is the result of averaging the 42 data sample products in Line E: The effective sample rate is now 171.43 KHz, and the data is passed to the channel filter process depicted in FIG. A8.

The purpose of the channel filter is to resolve the spectrum into frequency bins which are smaller than the signal in space utilization. In the example, the channels overlap by 2 where each channel filter is 20 KHz in width where the 3 dB rolloff is centered on the adjacent channel. The exact frequency allocation is dependent on system needs and a non-uniform frequency implementation may prove useful if statistical data determines transmitters distribution in frequency are not uniform. For the purposes of this document, it is assumed a uniform distribution is sufficient so each of the 16 channels are separated by ½ the signal frequency yielding a frequency uncertainty map up to±75 KHz.

Each channel filter performs a sinusoidal transform using a precalculated coefficient array. The coefficient array is merely a complex representation of a CW signal sampled at 171.43 KHz (G:). By performing a complex multiply of the decimated data against the channel filter coefficient (G:), a resulting product (H:) is a downconversion to DC for signals at the coefficient frequency. If the signal frequency error matches the channel filter signal, a maximum is realized at DC.

Each of the 16 channels have their own coefficient data, performing their own transform to baseband. The result is 16 product vectors (H:). A final decimation is performed to resolve the channel filters into a single complex vector. Once again a rectangular window is used to maximize sensitivity. Alternatively, a FIR filter could replace the sinusoidal coefficients of G: but due to the limited number of data points with respect to the sample rate, there is little improvement in ultimate rejection. By averaging (or summing as depicted), the bit period is finally resolved into a set of 16 complex vectors (I & Q).

The magnitude squared of these vectors is calculated by performing a sum of the square of the I and Q terms (J:). The magnitude squared is proportional to power (as the magnitude is proportional to voltage). A conversion to dB is performed to simplify trip and data demod. Each of the 16 channel magnitude squared terms is converted to its logarithm (base 10) term and multiplied by 10.

As the channels overlap, any desired signal will be expected to be observed in several of the channel filters. A smoothing function will help to attenuate noise in the channel filters without affecting the signal power. A weighted smoothing function which matches the channel filter rolloff characteristic maximizes sensitivity while attenuating noise. Each channel is attenuated slightly while adding a portion of the power from adjacent channels. Noise in any single channel is attenuated while the desired signal (which will be observed in multiple adjacent channels due to the overlapping filters) will be enhanced.

Throughout this discussion, it is assumed the processor performing the function has the capacity to maintain the resolution in coefficient and product terms. Some fixed point processors are limited in capability and care should be taken to ensure the coefficients or product rounding errors are insignificant with respect to signal or system characteristics.

Signal Search, Detection and Demodulation

The architecture discussed in this implementation produces 16 channels with overlapping filter characteristics to be applied to detection and copy functions. The number of implemented channels is arbitrary and limited by available computational processing resources. Tradeoff of filter rolloff characteristics with probability of detection requirements are necessary to determine optimal configurations. In this example, 16 channels are presented for search, trip and demodulation.

Search is the process where the signal received is correlated against the despreading PRC code to achieve correlation lock. In the search function, the signal and PRC are shifted relative to each other in an attempt to correlate the spreading and despreading PRC code.

In this example, the PRC is fixed and the sampled data is shifted by advancing or retarding the read pointer of the data received. This has the effect of slipping the data by ⅙ chip with respect to the PRC. As the processor is executing the algorithm at a multiple of the sample rate, greater resolution is possible. In the implementation discussed herein, the processor has a 3:1 instruction to sample ratio yielding a minimum correlation distance of±1/36 chip.

The present invention teaches the technique for search and trip where the information obtained during one bit period at one chip phase is relevant in the next bit period and/or bit phase. The technique is easiest understood in the context of search whereby the incoming data is slipped in phase 1 chip per bit period. As the phase approaches optimal correlation a peak in signal power will be observed. As the search process steps in 1 chip increments a maximum miss distance of ½ chip will occur near correlation center. At ½ chip distance a 6 dB attenuation occurs relative to perfect correlation. This energy will appear in one or several of the channel filter outputs. For the purpose of this discussion let us assume the signal is maximally observed in one channel.

A multi-stage trip algorithm can take advantage of the dynamics of this type of search process by noting that during two successive bit periods while passing perfect correlation the signal will reappear in the same channel with a 6 dB attenuation with respect to perfect correlation. Simultaneously, the noise will be random during the same two intervals and will average to a 3 dB advantage. By averaging the channel power over two successive bit periods, 3 dB of the signal strength is regained while the noise is attenuated 3 dB. A net 6 dB signal to noise advantage is realized.

FIG. A9 depicts a two stage trip algorithm which performs this function. The first trip algorithm seeks to find a trip channel over one bit interval. This is a classical peak detect algorithm which serves well in high signal to noise environments. The second trip algorithm averages all 16 channels over two successive bit intervals looking for signals while stepping through the correlation peak. This algorithm is quite effective as the signal to noise ratio gets small. The calculation of the noise floor is accomplished by averaging the signal power in all 16 channels (or alternatively by throwing out minimums and maximums) and then calculating a weighted average over the last N successive bit intervals.

As computational resources increase, this algorithm can readily be expanded to correlate incoming data against two or more phases of the same PRC code to perform this function in the same bit interval.

Voting logic decides which trip algorithm chooses the signal. Where neither detects a trip, the signal phase is slipped and the process repeats (search mode). When one trips, the trip channel is identified and the signal is sent to the demodulation stage. When both trip, the trip algorithm with the greatest signal to noise ratio is used.

Feedback is provided from the demodulation or revisit firmware as to the success of detecting preamble at tripped channels. A False Positive trip counter is maintained for each trip algorithm and an adaptive threshold is kept to manage False Positive trips. Each trip algorithm uses the threshold as an added term with the noise floor in determining when to trigger a trip. The thresholds are fast attack, slow decay with limits.

Following detection, the DSP resources can be reassigned in real time to drop some of the less interesting channels to free up computational resources. The resources can be directed toward better filters centered on the received signal to effectively center the noise bandwidth on the signal thus maximizing SNR.

In sum, the implementation described provides a means for realizing a digitized direct sequence receiver using modest computational processors. Excellent performance is achieved for interference rejection using digital filters which have no parallel in the analog art. Real time and parallel phase alignment of the PRC code is possible limited only by the computational burden of the product. Dynamic thresholding techniques improve detection and trip allowing the signal to be detected and demodulated at low signal to noise ratios. Reallocatable computational resources provide the means to allow for frequency uncertainty in the transmitter without suffering excessive noise bandwidth penalties in the receiver.

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

What is claimed is:

1. A direct sequence spread spectrum system for receiving packetized data bursts of aggregate data bandwidth of less than 120 Kbit/second, comprising:

a receiving means for receiving an RF signal;

a converting means for converting said RF signal to an IF signal;

an attenuation means for selectively attenuating one of said RF signal prior to conversion by said converting means and said IF signal;

a band-limiting means to band-limit said IF signal;

a digitizing means to digitize said band-limited IF signal using harmonic sampling techniques to produce a digital signal whose center frequency is greater than a chipping frequency of a spreading code of said IF signal;

a downconversion means to quadrature downconvert said digital signal to a baseband digital signal;

a despreading means to despread said baseband digital signal;

a filtering means to filter said despread baseband digital signal using plural filters each having a bandwidth of one of greater than and equal to a bandwidth of a signal of interest;

a detection means to detect candidate signals in at least one of the plural filters;

a selection means to select a filter for demodulation from the plural filters based on a candidate signal detected therein; and a demodulation means to demodulate data from the candidate signal in the selected filter.

2. The system according to claim 1, wherein said downconversion means and said despreading means are combined and comprise:

a means to produce a digital pseudo-random code (PRC) for despreading;

a means to low-pass filter said digital PRC to produce a spectrally compressed digital PRC;

a means to produce a quadrature digital downconversion tone having a center frequency that coincides with the center frequency of the digital signal;

a mixing means for mixing said digital PRC with said quadrature digital downconversion tone producing a hybrid despread and downconvert signal; and a means to downconvert and despread the digital signal by mixing said digital signal with said hybrid despread and downconvert signal.

3. The system according to claim 1, wherein said downconversion means and said despreading means are combined and comprise:

a means to pre-calculate and store for recall a digital pseudo-random code (PRC) for despreading;

a means to pre-calculate and store for recall a quadrature digital downconversion tone having a center frequency that coincides with the center frequency of the digital signal;

a means to pre-calculate and store for recall coefficients resulting from a mixing of said stored digital PRC with said stored quadrature digital downconversion tone to produce a hybrid despread and downconvert lookup table; and a means to downconvert and despread the digital signal by mixing the digital signal with said coefficients stored in said hybrid despread and downconvert lookup table.

4. The system according to claim 1, wherein said downconversion means and said despreading means are combined and comprise:

a means to pre-calculate and store for recall a digital pseudo-random code (PRC) for despreading;

a means to low pass filter said stored digital PRC to produce a spectrally compressed digital PRC;

a means to pre-calculate and store for recall a quadrature digital downconversion tone having a center frequency that coincides with the center frequency of the digital signal;

a means to pre-calculate and store for recall coefficients resulting from a mixing of said stored digital PRC with said stored quadrature digital downconversion tone to produce a hybrid despread and downconvert lookup table;

a means to downconvert and despread the digital signal by mixing the digital signal with said coefficients stored in said hybrid despread and downconvert lookup table.

5. The system according to claim 1 wherein said plural filters have overlapping bandwidths to reduce between-channel loss.

6. The system according to claim 1, wherein said despreading means, said filtering means, and said detection means operate to perform a method for detecting candidate signals, comprising the steps of:

slipping one relative code phase of a PRC code utilized in despreading by said despreading means;

incrementing a PRC period counter;

collecting a data sample of the baseband digital signal despread by said despreading means for a duration of a period of said PRC;

determining a correlation power value in each of multiple channels defined by said plural filters of the collected data sample;

calculating a mean correlation power value in each of said multiple channels over a predetermined number of PRC periods;

applying a first trip algorithm based on a current maximum channel correlation value, the mean correlation power value, and a first threshold value to determine whether a first trip condition exists;

applying a second trip algorithm based on an average correlation power of the current and a previous maximum channel correlation value, the mean power value, and a second threshold value to determine whether a second trip condition exists;

selecting, if both said first and second trip conditions exist, the trip algorithm having a largest peak-to-noise power value (SNR);

verifying the trip corresponding to the selected algorithm by collecting an additional data sample, recalculating correlation and mean correlation power values, and reapplying the selected trip algorithm;

performing message demodulation if the trip corresponding to the selected trip algorithm was verified as valid; and modifying the trip threshold value corresponding to the selected trip algorithm, if the trip corresponding to the selected trip algorithm was not verified as valid, by performing the substeps of, incrementing a counter that counts false positive trips for the selected trip algorithm, calculating a ratio of false positive trips against the a count of said PRC period counter;

increasing the threshold value corresponding to the selected trip algorithm if said false trip ratio is greater than a maximum target value, and decreasing the threshold value corresponding to the selected trip algorithm if said false trip ratio is less than a minimum target value.

7. The system according to claim 1, further comprising:

a means to produce a digital pseudo-random code (PRC) for despreading;

a means to produce a quadrature digital downconversion tone having a center frequency that coincides with the center frequency of the digital IF signal;

a mixing means for mixing said digital PRC with said quadrature digital downconversion tone to produce a hybrid despread and downconvert signal; and a means to downconvert and despread the digital IF signal by mixing said digital IF signal with said hybrid despread and downconvert signal.

8. The system according to claim 7, further comprising:

a decimation means for decimating said despread baseband digital signal when said baseband digital signal has a BW greater than a frequency ambiguity of said receiving means and a transmitter transmitting said RF signal, said decimation means comprising, a means to decimate the despread baseband digital signal to a BW of greater than or equal to a bandwidth of said candidate signal and less than or equal to said frequency ambiguity, and a means to further divide the decimated despread baseband digital signal into a plurality of adjacent filters.

9. The system according to claim 8, wherein said plurality of adjacent filters have overlapping bandwidths to reduce between-channel loss.

10. A method to enhance coarse search sensitivity in a direct sequence spread spectrum system utilizing dynamic thresholding techniques, comprising the steps of:

slipping one relative code phase of a pseudo-random code (PRC) used in despreading a received signal;

incrementing a PRC period counter;

collecting a data sample of said despread received signal for a duration of a period of said PRC;

determining a correlation power value in each of multiple channels of said data sample collected;

calculating a mean correlation power value in each of said multiple channels over a predetermined number of PRC periods;

applying a first trip algorithm based on a current maximum channel correlation value, the mean correlation power value, and a first threshold value to determine whether a first trip condition exists;

applying a second trip algorithm based on an average correlation power of the current and a previous maximum channel correlation value, the mean correlation power value, and a second threshold value to determine whether a second trip condition exists;

selecting, if both said first and second trip conditions exist, the trip algorithm having a largest peak-to-noise power value (SNR);

verifying the trip corresponding to the selected trip algorithm by collecting an additional data sample, recalculating correlation and mean correlation power values, and reapplying the selected trip algorithm;

performing message demodulation if the trip corresponding to the selected trip algorithm was verified as valid; and modifying the trip threshold value corresponding to the selected trip algorithm, if the trip corresponding to the selected trip algorithm was not verified as valid, by performing the substeps of, incrementing a counter that counts false positive trips for the selected trip algorithm, calculating a ratio of false positive trips against the a count of said PRC period counter;

increasing the threshold value corresponding to the selected trip algorithm if said false trip ratio is greater than a maximum target value, and decreasing the threshold value corresponding to the selected trip algorithm if said false trip ratio is less than a minimum target value.

11. A method to implement a downconversion and despread function in a direct sequence spread spectrum receiver, comprising the steps of:

producing a digital pseudo random code (PRC);

producing a quadrature digital downconversion tone whose center frequency coincides with a center frequency of a digital IF signal of said direct sequence spread spectrum receiver;

mixing said digital PRC with said quadrature digital downconversion tone to produce a hybrid despread and downconvert signal;

downconverting and despreading the digital IF signal by mixing said digital IF signal with said hybrid despread and downconvert signal.

12. The method according to claim 11, further comprising the steps of:

pre-calculating and pre-mixing said digital PRC and said quadrature digital downconversion tone to produce a hybrid despread and downconvert lookup table; and storing said hybrid despread and downconvert lookup table for subsequent use.

13. A method to implement a downconversion and despread function in a direct sequence spread spectrum receiver, comprising the steps of:

producing a digital pseudo random code PRC;

filtering said PRC with a low-pass filter to produce a spectrally compressed PRC;

producing a quadrature digital downconversion tone whose center frequency coincides with a center frequency of a digital IF signal of said direct sequence spread spectrum system;

mixing said spectrally compressed PRC with said quadrature digital downconversion tone to produce a hybrid despread and downconvert signal;

downconverting and despreading the digital IF signal by mixing said digital IF signal with said hybrid despread and downconvert signal.

14. The method according to claim 13, further comprising the steps of:

pre-calculating and pre-mixing said spectrally compressed PRC and said quadrature digital downconversion tone to produce a hybrid despread and downconvert lookup table; and storing said hybrid despread and downconvert lookup table for subsequent use.

* * * * *